C. C. MINOR.
PHOTOGRAPHIC OBJECTIVE.
APPLICATION FILED JUNE 7, 1912.
1,098,823.
Patented June 2, 1914.
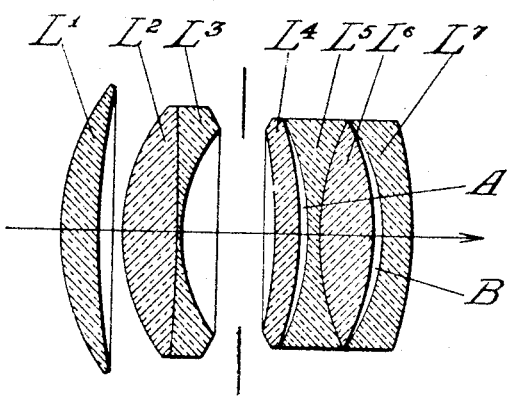
Witnesses:
Ephraim Banning
Thomas A. Banning Jr.
Inventor:
Charles C. Minor.
by Banning & Banning
Attorneys.

UNITED STATES PATENT OFFICE.

CHARLES C. MINOR, OF CHICAGO, ILLINOIS, ASSIGNOR OF ONE-EIGHTH TO WIRT F. SMITH AND ONE-FOURTH TO CHARLES L. JENNESS, BOTH OF CHICAGO, ILLINOIS.

PHOTOGRAPHIC OBJECTIVE.

1,098,823.     Specification of Letters Patent.     Patented June 2, 1914.

Original application filed May 26, 1910, Serial No. 563,595. Divided and this application filed June 7, 1912. Serial No. 702,254.

*To all whom it may concern:*

Be it known that I, CHARLES C. MINOR, a citizen of the United States, residing at Chicago, in the county of Cook and State of Illinois, have invented certain new and useful Improvements in Photographic Objectives, of which the following is a specification.

This invention relates to a lens system designed for photographic purposes, and is related to the type of objectives shown and described in my application filed May 26, 1910, Patent No. 1,077,420.

In the present invention, the lens system is shown as consisting on one side of the diaphragm of a meniscus lens, and on the other side of the diaphragm of a plurality of lenses forming between them air spaces of plus meniscus form; the remaining element of the lens system being a lens of plus meniscus form placed at either end of the lens system. As shown in the drawing, the last mentioned lens L' is placed in front of the meniscus lens $L^2$ of the front combination constituting therewith a combination of two meniscus lenses curved in the same direction with an intervening air space therebetween. For gaining furthermore truer chromatic corrections, the inner one of these two lenses is achromatized, or if need be over-corrected chromatically, by the addition of a cemented flint lens $L^3$. The rear combination consists of two positive elements $L^4$ and $L^6$ and two negative elements $L^5$ and $L^7$, two of these elements, one positive and one negative, being cemented together; the other elements are provided with facing surfaces having radii differing from the radii of the surfaces of the adjacent elements, so that air spaces A and B of plus meniscus form curved in the same direction intervene therebetween.

From the construction above described, distinct and important advantages are gained. It is possible to secure a high relative aperture equaling about f 1.7 with practically the entire image field anastigmatically flattened, as well as to gain an exceptionally high degree of spherical correction and freedom from coma. There is also gained the much desired telephoto effect through causing the nodal point to lie in front of the front combination. There are many advantages gained by such a construction, the importance of which is obvious in the practical use of very rapid photographic lenses.

As is well known the image of a telephoto lens being considerably magnified over and above the size of an image given by any normal lens of the same size and distance from the focusing screen, the illumination is not only undiminished, but the depth of focus or rather depth of field is greatly increased, because of the fact that this results from a comparatively short focus lens system. In the present invention this result is accomplished by shortening as far as possible the focus of the first mentioned element in front, and, also by lengthening the focal power of the next or cemented lens, or better still by giving it a decided minus focal power, and lastly by causing the focus of the back combination taken as a whole to be from three or four times that of the front combination, to a focus equal to zero or of minus focal power.

In the lens system described, the kinds of glass which may be used are almost without limitation.

I claim:

1. A photographic objective in which one component thereof consists of two meniscus lenses having two facing surfaces, one of said lenses having a cemented surface, and the other component of which comprises a plurality of lenses having two pairs of facing surfaces and one cemented surface, the radii of each of said pairs of facing surfaces being different so as to form air spaces of plus meniscus form, said air spaces being curved in the same direction.

2. In a photographic doublet having the nodal point thereof without the lens system, the front combination consisting of two lenses of meniscus form separated by an air space, one of the said lenses consisting of a crown and flint element cemented together, and the rear combination consisting of a plurality of lenses separated from each other by at least two air spaces of plus meniscus form, the focus of said rear combination being from three times the focus of the front combination to a focus equal to zero or minus.

3. In a photographic doublet having the nodal point thereof without the lens system, the front combination consisting of two lenses of meniscus form separated by an air space, one of said lenses being over-corrected chromatically, and the rear combination consisting of a plurality of lenses separated from each other by at least two air spaces of plus meniscus form, the focus of said rear combination being from substantially three times the focus of the front combination to a focus equal to zero or minus.

CHARLES C. MINOR.

Witnesses:
EPHRAIM BANNING,
CHARLES L. JENNESS.